US012750453B2

(12) United States Patent
Swysen

(10) Patent No.: US 12,750,453 B2
(45) Date of Patent: Sep. 29, 2026

(54) IMAGE FORMING APPARATUS

(71) Applicant: CANON KABUSHIKI KAISHA, Tokyo (JP)

(72) Inventor: Ken Swysen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 303 days.

(21) Appl. No.: 18/590,034

(22) Filed: Feb. 28, 2024

(65) Prior Publication Data

US 2024/0297945 A1 Sep. 5, 2024

(30) Foreign Application Priority Data

Mar. 3, 2023 (JP) ................................ 2023-032725

(51) Int. Cl.
*H04N 1/08* (2006.01)
*H04N 1/00* (2006.01)

(52) U.S. Cl.
CPC ....... *H04N 1/0882* (2013.01); *H04N 1/00602* (2013.01); *H04N 1/00652* (2013.01); *H04N 1/00745* (2013.01); *H04N 1/00822* (2013.01)

(58) Field of Classification Search
CPC ............. H04N 1/0882; H04N 1/00602; H04N 1/00652; H04N 1/00745; H04N 1/00822
See application file for complete search history.

(56) References Cited

U.S. PATENT DOCUMENTS 8,614,839 B2 * 12/2013 Sano .................. H04N 1/00774 358/461
2017/0261890 A1 9/2017 Takatsuka et al.
2020/0366808 A1 * 11/2020 Lee ........................ H04N 1/122

FOREIGN PATENT DOCUMENTS

JP H04134358 A 5/1992
JP 2006248644 A 9/2006
JP 2017161727 A 9/2017

* cited by examiner

*Primary Examiner* — Quang N Vo
(74) *Attorney, Agent, or Firm* — ROSSI, KIMMS & McDOWELL LLP

(57) ABSTRACT

An image forming apparatus includes an image forming unit, a registration roller pair, an upstream roller pair, a detection unit, a driving device, a control unit. During execution of the accuracy priority mode, when a time from start of a rotation of the registration roller pair to detection of a leading edge of a sheet by the detection unit is a first time, a time from the detection of the leading edge to reach of a conveyance speed to the second speed is a second time, and, when a time from the start of the rotation to the detection of the leading edge is a third time, the time from the detection of the leading edge to the reach of the conveyance speed to the second speed is a fourth time, the third time is longer than the first time and the fourth time is shorter than the second time.

10 Claims, 6 Drawing Sheets

IMAGE FORMING APPARATUS

BACKGROUND OF THE INVENTION

Field of the Invention

This disclosure relates to an image forming apparatus that forms an image on a sheet.

Description of the Related Art

Hitherto, as for image forming apparatuses such as facsimile machines, copying machines, multifunction peripherals (MFPs), a technique of stopping a sheet by a registration roller pair (registration roller pair) in synchronization with a timing of image formation is widely adopted. In these image forming apparatuses, by controlling a timing to resume sheet conveyance by the registration roller pair, a position of the sheet is aligned with a position of an image formed on the sheet. Further, in these image forming apparatuses, apparatuses that include a position detecting sensor (called as a post-registration sensor) arranged downstream of the registration roller pair in a sheet conveyance direction and upstream of a transfer position in the sheet conveyance direction are known. In these image forming apparatuses, using, for example, the post-registration sensor, it is possible to perform the control that precisely aligns the position of the image with the position of the sheet relative to each other, and this control is referred to as leading edge registration control.

As the image forming apparatuses that execute the leading edge registration control using the post-registration sensor, for example, the following types of the image forming apparatuses have been developed. As an example, an image forming apparatus has been developed, which performs the control as follows: by a resumption of the rotation of the registration roller pair, the sheet is conveyed at a process speed, and whether a detection timing at the post-registration sensor is slower or faster than a reference value is detected; based on this detection result, the sheet is accelerated or decelerated, and thereafter the speed of the sheet is returned to the process speed before the sheet arrives at the transfer position (refer to Japanese Patent Laid-Open No. 2006-248644). Further, as another example, an image forming apparatus which changes a conveyance speed of the sheet conveyed by the registration roller pair from the process speed to a first speed (slower than process speed), to a second speed (faster than the first speed), and finally back to the process speed has been developed (refer to Japanese patent Laid-Open No. 2017-161727). In this image forming apparatus, based on sheet arrival time detected by the post-registration sensor, the length of a time during which the sheet is conveyed at the second speed is adjusted.

Incidentally, in recent years, there is a demand for the further enhancement of image quality. Therefore, further improvement in accuracy in the leading edge registration control, namely, further improvement in alignment in the sheet conveyance direction is required. On the other hand, by a demand for the miniaturization of the image forming apparatuses, sometimes, a distance from the registration roller pair to the transfer position is decreased, or a sheet conveyance path from a manual feed tray or a duplex conveyance path to the registration roller pair is designed in a steeply curved shape. Therefore, while the further enhancement in the accuracy in the leading edge registration control (leading edge resist control) is demanded, hardware is becoming difficult to realize the enhancement in the accuracy.

In the image forming apparatuses described in Japanese Patent Laid-Open Nos. 2006-248644 and 2017-161727 described above, when conveying the sheet by the registration roller pair, the sheet is accelerated to the process speed, and is decelerated after the sheet is detected by the post-registration sensor. Therefore, when a distance from the registration roller pair to the post-registration sensor is decreased, since the sheet is decelerated after having been accelerated to the process speed within such a short distance, errors become more likely to increase in comparison with a case where there is a sufficient distance, so that there is the risk of diminishing correction accuracy in a sheet position adjustment.

In other words, for example, in a case where a two-sided fed sheet is determined to be delayed based on the detection result of the post-registration sensor, an operation to accelerate the registration roller pair is executed. However, since, in comparison with commercial printing machines, conveyance resistance in the duplex conveyance path in small office machines is large because of greater bends due to limitations in the width of an apparatus body, conveyance load torque increases, so that there is the risk of the occurrence of motor desynchronization. Further, so as to compensate a few millimeters of a delay caused by a conveyance variation within the short distance from the registration roller pair to the transfer position, it is necessary to accelerate significantly higher than a reference speed. However, in the case of the conveyance path described above where the conveyance load torque is high, there is a limit on the acceleration. Therefore, for example, in an image forming apparatus using vertical path conveyance, sometimes, the conveyance load torque is large at the time of such as feeding from the duplex conveyance path and the manual feed tray. In a case where the sheet is fed through these paths, since a correctable leading edge registration amount is reduced by an acceleration limit on the sheet conveyance speed conveyed by the registration roller pair, there is the risk of diminishing the correction accuracy in the leading edge registration control.

The purpose of this disclose is to provide an image forming apparatus that can improve the correction accuracy in the leading edge registration control.

SUMMARY OF THE INVENTION

According to a first aspect of the present invention, an image forming apparatus includes an image forming unit configured to form an image on a sheet at an image forming position, a registration roller pair positioned upstream of the image forming position in a conveyance path of the sheet, and configured to convey the sheet to the image forming position such that the image is formed on the sheet, an upstream roller pair positioned upstream of the registration roller pair in the conveyance path, and configured to convey the sheet to the registration roller pair, a detection unit configured to detect a leading edge of the sheet at a detecting position between the registration roller pair and the image forming position in the conveyance path, a driving device configured to drive the registration roller pair and the upstream roller pair, and a control unit configured to control the driving device. The control unit is configured to execute an accuracy priority mode and a speed priority mode selectively. In the accuracy priority mode, after the leading edge of the sheet conveyed by the upstream roller pair has abutted against the registration roller pair that was stopping, the control unit is configured to start rotation of the registration roller pair to convey the sheet while accelerating a conveyance speed of the sheet to a first speed within a range slower than a process speed of the image forming unit, and after the leading edge of the sheet has been detected by the detection unit, the control unit is configured to accelerate the conveyance speed from the first speed to a second speed faster than the first speed to convey the sheet to the image forming position. In the speed priority mode, after the leading edge of the sheet conveyed by the upstream roller pair has abutted against the registration roller pair that was stopping, the control unit is configured to start rotation of the registration roller pair to convey the sheet while accelerating the conveyance speed to a third speed faster than the process speed, and after the leading edge of the sheet has been detected by the detection unit, the control unit is configured to decelerate the conveyance speed from the third speed to a fourth speed that is slower than the third speed and is the process speed or faster to convey the sheet to the image forming position. During execution of the accuracy priority mode, in a case where a time from start of the rotation of the registration roller pair to detection of the leading edge of the sheet by the detection unit is a first time, a time from the detection of the leading edge of the sheet by the detection unit to reach of the conveyance speed to the second speed is a second time, and, in a case where a time from the start of the rotation of the registration roller pair to the detection of the leading edge of the sheet by the detection unit is a third time, the time from the detection of the leading edge of the sheet by the detection unit to the reach of the conveyance speed to the second speed is a fourth time, the third time is longer than the first time and the fourth time is shorter than the second time.

According to a first aspect of the present invention, an image forming apparatus includes an image forming unit configured to form an image on a sheet at an image forming position, a registration roller pair positioned upstream of the image forming position in a conveyance path of the sheet, and configured to convey the sheet to the image forming position such that the image is formed on the sheet, an upstream roller pair positioned upstream of the registration roller pair in the conveyance path, and configured to convey the sheet to the registration roller pair, a detection unit configured to detect a leading edge of the sheet at a detecting position between the registration roller pair and the image forming position in the conveyance path, a driving device configured to drive the registration roller pair and the upstream roller pair, and a control unit configured to control the driving device. The control unit is configured to execute an intermediate mode. In the intermediate mode, after the leading edge of the sheet conveyed by the upstream roller pair has abutted against the registration roller pair that was stopping, the control unit is configured to start rotation of the registration roller pair to convey the sheet such that the registration roller pair accelerates the sheet to an eighth speed faster than a process speed of the image forming unit and decelerates the sheet to a ninth speed slower than the eighth speed and the process speed, and after the leading edge of the sheet has been detected by the detection unit, the control unit is configured to accelerate a conveyance speed of the sheet from the ninth speed to a tenth speed faster than the ninth speed to convey the sheet to the image forming position. During execution of the intermediate mode, in a case where a time from start of the rotation of the registration roller pair to detection of the leading edge of the sheet by the detection unit is a fifth time, a time from the detection of the leading edge of the sheet by the detection unit to reach of the conveyance speed to the tenth speed is a sixth time, and in a case where a time from the start of the rotation of the registration roller pair to the detection of the leading edge of the sheet by the detection unit is a seventh time, the time from the detection of the leading edge of the sheet by the detection unit to the reach of the conveyance speed to the tenth speed is an eighth time, the seventh time is longer than the fifth time and the eighth time is shorter than the sixth time.

Further features of the present invention will become apparent from the following description of exemplary embodiments with reference to the attached drawings.

DESCRIPTION OF THE EMBODIMENTS

Hereinafter, using drawings, the present embodiment will be described. First, a schematic configuration of an image forming apparatus 1 of the present embodiment will be described using FIG. 1. Size, materials, relative positions, and the like of constituent components of the image forming apparatus 1 are not intended to limit the scope of this disclosure only to those aspects, unless specifically stated otherwise. Further, as the image forming apparatus 1, a full color copying machine including a plurality of photosensitive drums is applied in the present embodiment. However, it is not limited to this, and it is possible to apply this disclosure to monochrome or mono color copying machines or printers including a single photosensitive drum.

Image Forming Apparatus

Figure 1:
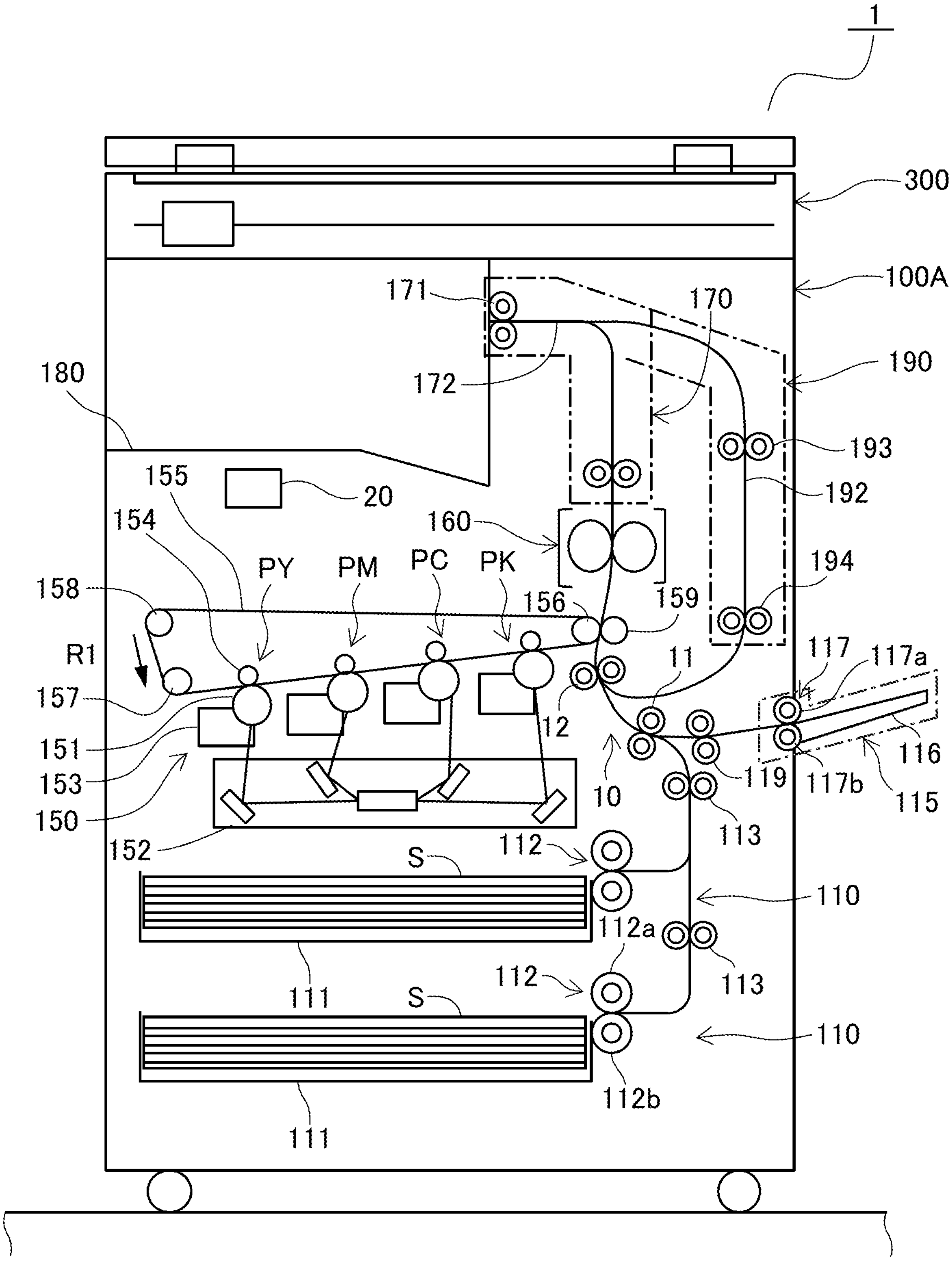
FIG. 1 is a cross-sectional view illustrating an image forming apparatus of an embodiment.

FIG. 1 is a schematic diagram illustrating the image forming apparatus 1 of the present embodiment. The image forming apparatus 1 forms an image on a sheet used as a recording medium based on image information input from an external personal computer (PC) or image information read from a document. The sheet used as the recording medium includes various sheet materials which are different in size and materials, including paper such as cardboard, standard paper and, thin paper, which are different in grammage, an envelope, a plastic film for an overhead projector, cloth, and the like.

The image forming apparatus 1 includes an apparatus body 100A that incorporates an image forming unit 150 forming the image on the sheet, and an image reading apparatus 300 that is arranged above the apparatus body 100A and reads the image information from the document. The image forming unit 150 is an electrophotographic unit of an intermediate transfer system including four image forming stations PY, PM, PC, and PK, an intermediate transfer belt 155, and a fixing unit 160.

Each of the image forming stations PY to Pk performs an electrophotographic process, and forms a toner image on a surface of a photosensitive drum, serving as an image bearing member. That is, when the formation of the toner image is demanded with respect to the image forming stations PY to PK, the photosensitive drum 151 consisted from a photosensitive member is rotatably driven, and a charge unit uniformly charges the surface of the photosensitive drum 151. An exposure unit 152 disposed in a lower part of the apparatus body 150A emits a laser beam to the photosensitive drum 151 based on the image information, and writes an electrostatic latent image on the photosensitive drum 151. A developing unit 153 supplies a charged toner particle to the photosensitive drum 151, and develops the electrostatic latent image on the surface of the drum as the toner image.

The toner image of each color formed on the surface of the photosensitive drum 151 in each of the image forming stations PY to PK is finally transferred onto the sheet S via the intermediate transfer belt 155 and a secondary transfer roller 159. First, the toner image borne on each photosensitive drum 151 is primarily transferred onto the intermediate transfer belt 155 by a primary transfer roller 154. Deposits such as the toner remained on the photosensitive drum 151 is collected by a cleaning unit disposed in each of the image forming stations PY to PK.

The intermediate transfer belt 155, serving as an intermediate transfer member, is wound around the secondary transfer roller 156, a tension roller 157, and a stretch roller 158, and is rotatably driven in an arrow R1 direction in FIG. 1. The toner image borne by the intermediate transfer belt 155 is secondarily transferred onto the sheet S in a secondary transfer portion 13 formed between the secondary transfer roller 159 facing a secondary transfer inner roller 156 and the intermediate transfer belt 155. That is, the image forming unit 150 forms the image on the sheet S at the secondary transfer portion 13 serving as an image forming position. Deposits such as the toner remained on the intermediate transfer belt 155 is collected by a belt cleaning apparatus.

The sheet S onto which the toner image has been transferred is delivered to the fixing unit 160. The fixing unit 160, serving as a fixing unit of the present embodiment, includes a fixing roller, serving as a rotary member conveying the sheet S, a pressing roller nipping the sheet S with the fixing roller, and a heat source (for example, a halogen lamp) heating the toner image on the sheet. By applying heat and pressure to the toner image while conveying the sheet S, the fixing unit 160 melts the toner. Thereafter, the toner is fixed, and the image is fixed on the sheet S.

In parallel with the image forming process described above, from a cassette feed unit 110 or a multi-purpose feeding portion 115, the sheet S is fed toward the image forming unit 150 one sheet at a time. The cassette feed unit 110 includes vertically two-tiered feed cassettes 111 and 111 (sheet cassettes), and a sheet feed unit 112 feeding the sheet S from each of the feed cassettes 111 and 111. The feed cassettes 111 and 111 are incorporated in the apparatus body 100A. The feed cassette 111 is an example of a feed cassette that, by being positioned upstream of a pre-registration roller pair (pre-registration roller pair) 11 in a sheet conveyance path, stores the sheet S which is fed to the pre-registration roller pair 11.

Further, the multi-purpose feeding portion 115 includes a multi-purpose tray 116 and a sheet feed unit 117 feeding the sheet S set on the multi-purpose feed tray 116. The sheet feed units 112 and 117 respectively include feed rollers 112*a* and 117*a* sending the sheet S and separation rollers 112*b* and 117*b* separating the sheet S conveyed by the feed rollers 112*a* and 117*a* into one sheet at a time. To be noted, the sheet feed units 112 and 117 may be replaced with other mechanisms such as a separation pad type or an air feeding type. The multi-purpose tray 116 is positioned upstream of the pre-registration roller pair 11 in the sheet conveyance path, and is an example of a manual feed tray on which the sheet S fed to the pre-registration roller pair 11 is supported.

The sheet S fed by the sheet feed units 112 and 117 is conveyed to a skew correction portion 10 via drawing roller pairs 113 and 119. The skew correction portion 10 of the present embodiment are formed by the pre-registration roller pair 11 and a registration roller pair (registration roller pair) 12. In particular, as described below, the skew correction portion 10 corrects the skew of the sheet S, and sends the sheet S to the secondary transfer portion 13 in a timing synchronizing with a progress of the image forming process by the image forming unit 150.

The registration roller pair 12 is positioned upstream of the secondary transfer portion 13 of the image forming unit 150 in the conveyance path of the sheet S, and is an example of a registration roller pair that conveys the sheet S to the secondary transfer portion 13 in synchronization with a timing of forming the image on the sheet S. That is, the registration roller pair 12 conveys the sheet S to the secondary transfer portion 13 such that the image is formed on the sheet S. The pre-registration roller pair 11 is positioned upstream of the registration roller pair 12 in the sheet conveyance path, and is an example of an upstream roller pair that conveys the sheet S to the registration roller pair 12. To be noted, in the present embodiment, the image forming apparatus 1 includes a vertical path conveyance configuration. That is, when viewed in a rotational axis direction of the registration roller pair 12, a nip line of the registration roller pair 12 is disposed such that a smaller angle formed with a horizontal line is equal to or more than 45 degrees.

The sheet S on which the image has been formed by passing through the secondary transfer portion 13 and the fixing unit 160 is conveyed to a sheet discharge roller 171 by a post-fixing conveyance portion 170. The sheet discharge roller 171 discharges the sheet S on which the image has been formed, and loads the sheet on a sheet discharge tray 180 disposed on the top of the apparatus body 100A. The sheet is supported by the sheet discharge tray 180. To be noted, in the present embodiment, a so-called in-body discharge type configuration in which a discharge space (upper space of the sheet discharge tray 180) for loading the sheet S is disposed between the apparatus body 100A and the image reading apparatus 300 in a vertical direction is applied.

The sheet discharge roller 171 is an example of a reverse portion that reverses and conveys the sheet S, onto whose first surface the image has been transferred in the image forming unit 150, so as to transfer the image onto a second surface opposite to the first surface. That is, in a case of duplex printing, the sheet discharge roller 171 conveys the sheet S on whose first surface the image has been formed, and, when a trailing edge of the sheet S has passed a branch portion 172, switchbacks the sheet S by reversing the conveyance direction. Thereby, the sheet S is delivered to a duplex conveyance portion 190. By re-conveyance roller pairs 193 and 194 of the duplex conveyance portion 190, the sheet S is conveyed toward the registration roller pair 12 via a duplex path 192. The duplex path 192 is an example of a duplex conveyance path through which the sheet S reversed by the sheet discharge roller 171 is again conveyed from the re-conveyance roller 194 toward the registration roller pair

12. To be noted, the re-conveyance roller pair 194 is positioned upstream of the registration roller 12 in the sheet conveyance path, and is an example of an upstream roller pair that conveys the sheet S to the registration roller pair 12. Then, the sheet S on which, after skew was again corrected by the registration roller pair 12, the image has been formed on the second surface by passing through the secondary transfer portion 13 and the fixing unit 160 is discharged by the sheet discharge roller 171, and is loaded on the sheet discharge tray 180.

In the description described above, the image forming unit 150 is an example of an image forming unit, and it is acceptable to use an electrophotographic unit of a direct transfer method, or an image forming unit of an inkjet or an offset printing technique.

Control System

Figure 2:
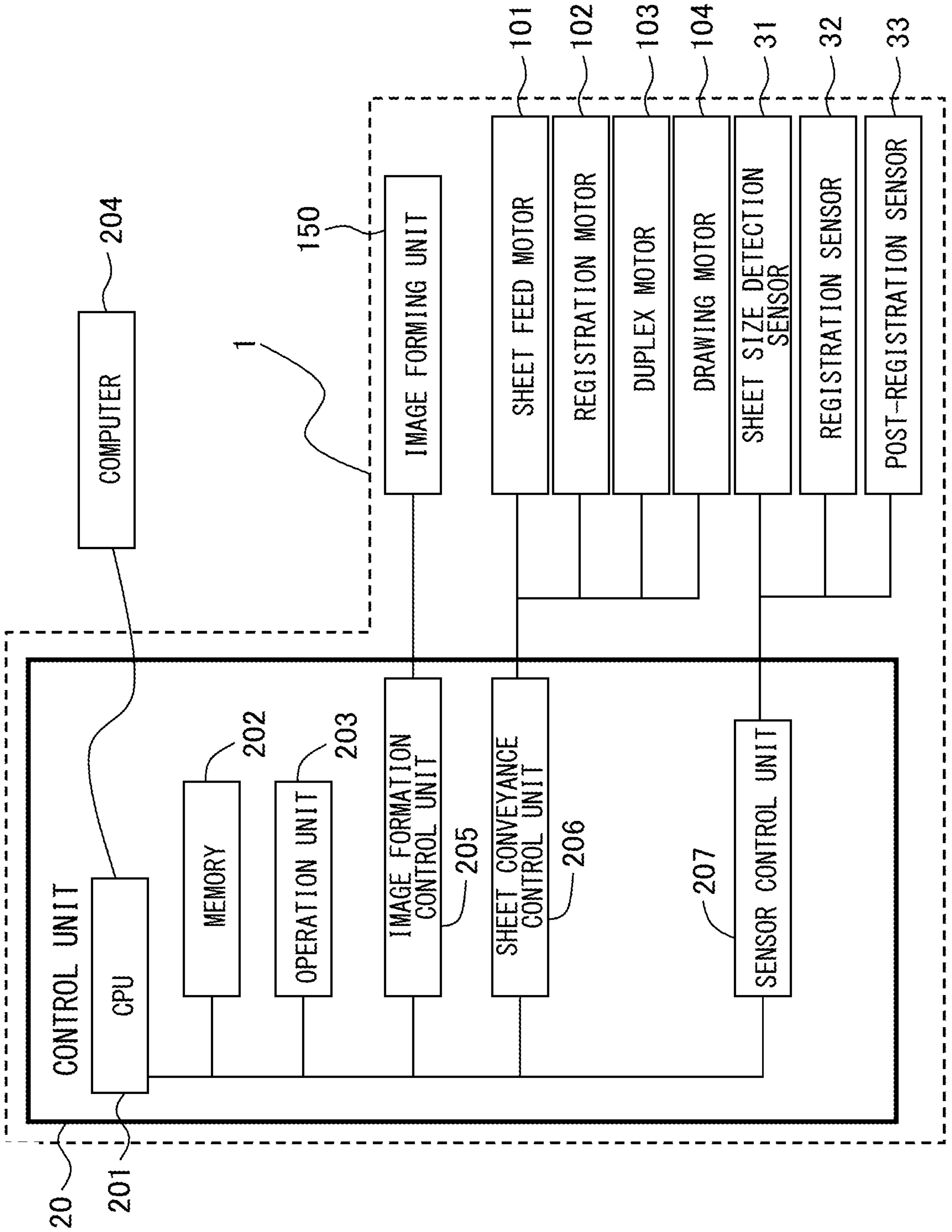
FIG. 2 is a block diagram illustrating a control system of the embodiment.

Next, using FIG. 2, a control unit 20 controlling a functional configuration that the image forming apparatus 1 includes will be described. FIG. 2 is a block diagram illustrating the control unit 20 of the image forming apparatus 1. The control unit 20 includes various functional units such as a central processing unit (CPU) 201, a memory 202, an operation unit 203, an image formation control unit 205, a sheet conveyance control unit 206, and a sensor control unit 207.

By executing such as a predetermined control program, the CPU 201 achieves various processes that the image forming apparatus 1 performs. The memory 202 is such as a random access memory (RAM) and a read only memory (ROM), and stores various programs and various data in predetermined storage areas. The operation unit 203 receives a range of user operations which a user perform, including various information (such as size information, grammage information, information on surface properties) relating to the sheet S that the user uses for printing, and instructions for starting and interrupting the printing.

The image formation control unit 205 sends instructions with respect to the image forming unit 150 including the exposure unit 152, and controls the image formation. The sheet conveyance control unit 206 sends instructions to such as a sheet feed motor 101, a registration motor 102, a duplex motor 103, and a drawing motor 104, and controls the conveyance of the sheet S. The sensor control unit 207 controls starting and stopping of detection operations of sensors such as a sheet size detection sensor 31, a registration sensor 32, and a post-registration sensor (post-registration sensor) 33, and receives a detection result of each sensor. To be noted, it is possible to configure such that various information relating to the sheet S used for the printing can be received through, for example, a computer (for example, a computer 204 illustrated in FIG. 2) that is connected via a network.

The sheet feed motor 101, the registration motor 102, the duplex motor 103, and the drawing motor 104 respectively rotate the pre-registration roller pair 11, the registration roller pair 12, the re-conveyance roller pairs 193 and 194, and the drawing roller pair 119. That is, the sheet feed motor 101, the registration motor 102, and the duplex motor 103 are examples of drive units that drive the registration roller pair 12, the pre-registration roller pair 11, and the re-conveyance roller pair 194, and are controlled by the control unit 20.

Sheet Conveyance Control

Figure 3:
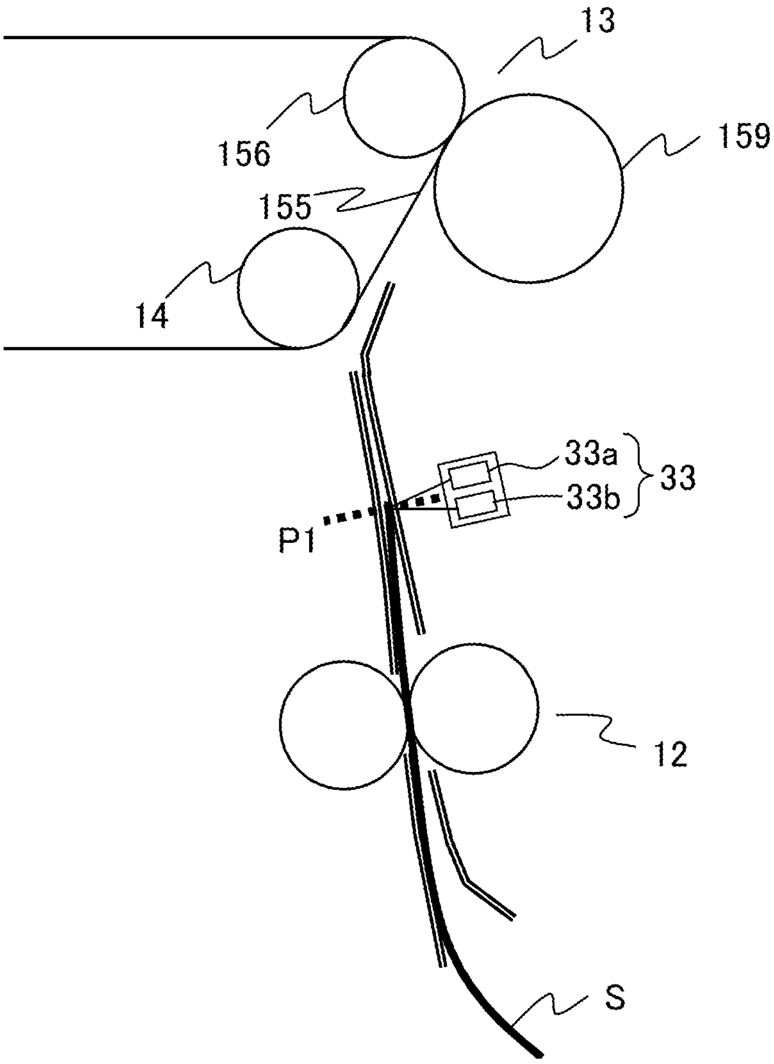
FIG. 3 is a cross-sectional view illustrating a configuration from a registration roller pair to a secondary transfer portion of the image forming apparatus.

Next, using FIG. 3, basic sheet conveyance control from the registration roller pair 12 to the secondary transfer portion 13 will be described. FIG. 3 is a front cross-sectional view illustrating a configuration from the registration roller pair 12 to the secondary transfer portion 13 of the image forming apparatus 1.

First, arrangements of components will be described. A pre-secondary transfer roller 14 (not shown in FIG. 1) over which the intermediate transfer belt 155 is stretched is disposed upstream of the secondary transfer inner roller 156 in the sheet conveyance direction. In the sheet conveyance direction, the post-registration sensor 33 is arranged downstream of the registration roller pair 12 and upstream of the secondary transfer portion 13. The post-registration sensor 33 detects a passage of a leading edge of the sheet S through a detecting position P1. By detecting a timing (hereinafter referred to as a registration ON) of a resumption of the drive of the registration roller pair 12 and a timing of the passage of the sheet S through the post-registration sensor 33, the control unit 20 detects the length of a time required for the conveyance of the sheet from the registration roller pair 12 to the post-registration sensor 33.

The post-registration sensor 33 is positioned between the registration roller pair 12 and the image forming unit 150 in the sheet conveyance path, and is an example of a detection unit that detects the leading edge of the sheet S at a detecting position P1 between the registration roller pair 12 and the secondary transfer portion 13 in the conveyance path. In the present embodiment, the post-registration sensor 33 includes a light emitting portion 33*a* emitting light to the sheet conveyance path and a light receiving portion 33*b* receiving the light emitted from the light emitting portion 33*a*, and is configured as a photosensor that detects the passage of the leading edge of the sheet S. To be noted, it is acceptable to apply a photosensor in which light emitting and receiving portions are arranged to face each other across the sheet conveyance path. As for the photosensor, it is possible to use an appropriate photosensor or mechanical switch that directly detects the leading edge of the sheet S. Alternatively, instead of directly detecting the leading edge of the sheet S, it is acceptable to configure such that a position of the leading edge of the sheet S is calculated by using, for example, a sheet width sensor.

Next, the sheet conveyance control will be described. Upon detecting the registration ON, the sheet S is accelerated to a speed Von that is a speed to which the sheet is accelerated after the registration ON and the sheet is conveyed at the speed Von. After having passed through the post-registration sensor 33, a speed of the sheet S is changed to a speed Vps, which is a process speed of the image formation, before the sheet S approaches the pre-secondary transfer roller 14. In a case where the conveyance speed of the sheet S is changed with the sheet S being in contact with the intermediate transfer belt 155, since there is the risk of shearing so as to disturb a transferred image on the intermediate transfer belt 155, the speed change is completed before the sheet S approaches the pre-secondary transfer roller 14.

Speed Priority Mode

Figure 4:
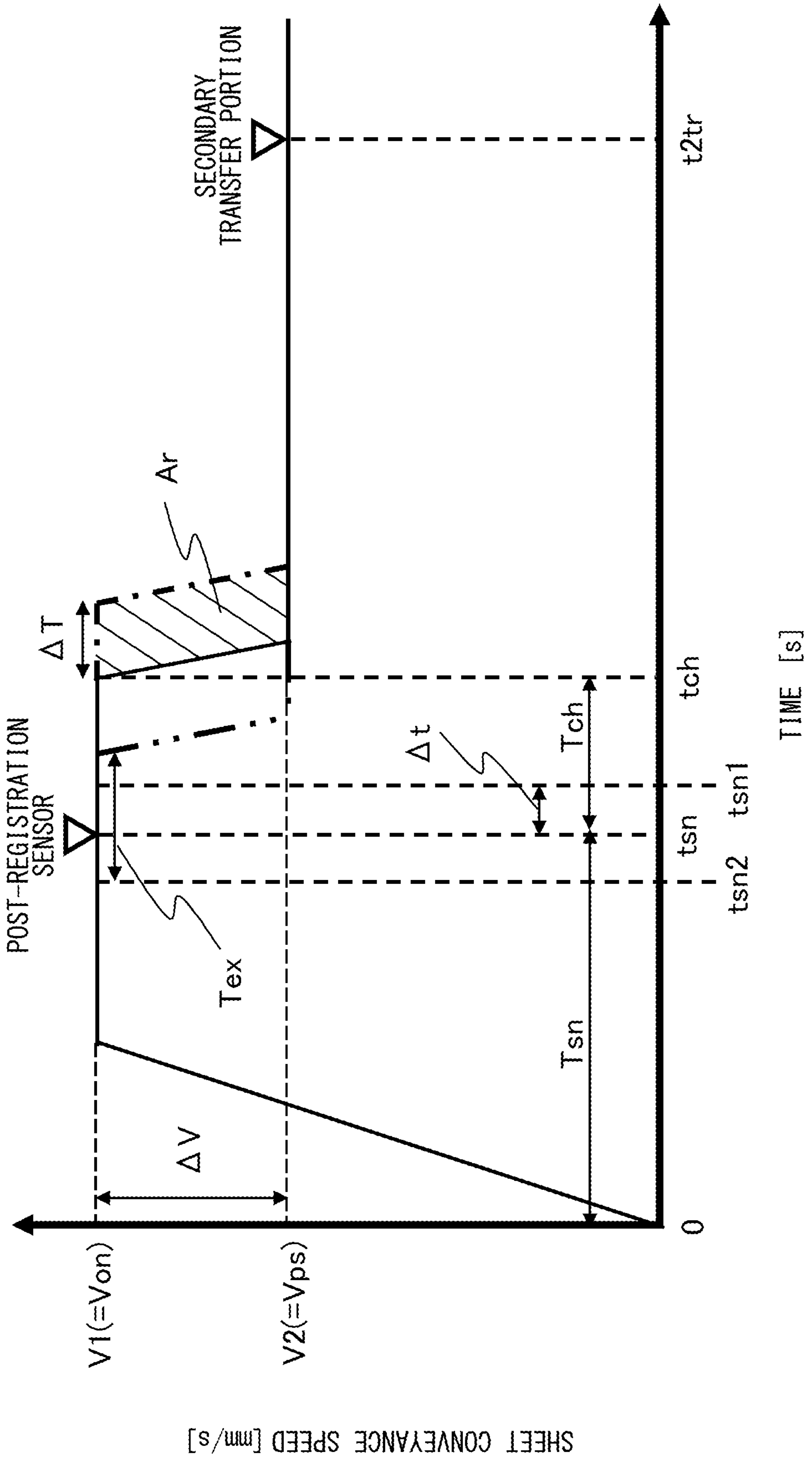
FIG. 4 is a graph illustrating an operation of a speed priority mode of leading edge registration control in the image forming apparatus of the embodiment.

Next, using FIG. 4, a speed priority mode of a leading edge registration control for a purpose of enhancing the accuracy of a leading edge margin of the image will be described. FIG. 4 is a graph illustrating the speed priority mode of the sheet conveyance control of the registration roller pair 12, related to the leading edge registration control. FIG. 4 illustrates the graph with time on a horizontal axis and the sheet conveyance speed on a vertical axis, setting the time of the registration ON as the zero point on the horizontal axis.

The control unit 20 activates the registration ON, which is calculated in reverse to ensure that the sheet S arrives in time when a leading edge of the image reaches the secondary transfer portion 13 at a timing t2*tr*. After the registration ON, the sheet S is conveyed by being accelerated to the speed Von (=V1), and passes through the post-registration sensor 33. At this time, sometimes, the time tsn that is the time at which the leading edge of the sheet S passes through the post-registration sensor 33 may vary. The variation in the passage time of the leading edge of the sheet S through the post-registration sensor 33 is primarily due to a variation in a stop position of the sheet S in the registration roller pair 12, and fluctuations in the conveyance speed after the registration ON. Further, variations can arise also due to variations in the thickness, the grammage, and surface properties of the sheet S, changes in a diameter and a friction coefficient of the registration roller pair 12 resulting from wear caused by continuous sheet passing, and changes in the pressure of the registration roller pair 12 and an amount of an abutment loop created in the registration roller 12. Further, variations can also arise due to factors such as the sheet stop posture, stop time, and motor drive characteristics in the registration roller pair 12, which are dependent on a sheet feed tray. When translated into a conveyance distance, the variations in the sheet conveyance timing caused by these factors are approximately ±2 millimeters (mm), and this is considered as a deviation in the worst case.

In the leading edge registration control, a deviation Δt in the passage time through the post-registration sensor 33 is detected for each sheet. The control unit 20 calculates a timing to change a sheet conveyance speed from a sheet conveyance speed V1 to a sheet conveyance speed V2 that is a speed after passing through the post-registration sensor 33, and executes a change in a speed. Thereby, a timing at which the sheet S reaches the secondary transfer portion 13 is stabilized, and it is possible to stabilize the leading edge margin length of the image on the sheet.

The leading edge registration control illustrated in FIG. 4 is the speed priority mode in which a relationship is set such that the speed V1 is larger than the speed V2. The speed V1 is equal to the speed Von that is the speed after the registration ON, and the speed V2 is equal to the process speed Vps of the image formation. By setting the speed V1 to be faster than the process speed Vps, the sheet conveyance time t2*tr* from the registration roller pair 12 to the secondary transfer portion 13 can be shortened, and, thereby, it is possible to increase the productivity of a printing operation.

That is, in the speed priority mode, the leading edge of the sheet S conveyed by, for example, the re-conveyance roller 194 is abutted against the registration roller pair 12 that is stopping. Thereafter, the registration roller pair 12 starts rotation, and conveys the sheet S while accelerating the conveyance speed to the speed V1 (third speed) that is faster than the process speed Vps. Then, after the leading edge of the sheet S has been detected by the post-registration sensor 33, the registration roller pair 12 conveys the sheet S to the image forming unit 150 while decelerating the conveyance speed to the speed V2 (fourth speed) that is slower than the speed V1.

When the speed Vi is larger than the speed V2, in a case where the passage time of the leading edge of the sheet S through the post-registration sensor 33 is slower than a predetermined time tsn, the length of time (Tch=tch−tsn) for changing the speed from V1 to V2 is extended to longer than a predetermined value, and, by increasing a distance conveyed at the speed V1 that is faster than the speed V2, the delay is compensated. Here, in a case of a maximum controllable delay, the leading edge of the sheet S is detected by the post-registration sensor 33 at time tsn1 (illustrated by one-dot chain lines in FIG. 4). Even in this case, as described above, it is necessary to complete the change in the speed from V1 to V2 before the leading edge of the sheet S approaches the pre-secondary transfer roller 14.

Further, in a case where the passage time of the leading edge of the sheet S through the post-registration sensor 33 is faster than the predetermined value, the length of a time (Tex) for changing the speed from V1 to V2 is shortened to less than the predetermined value. Here, in a case of controllable fastest arrival, the leading edge of the sheet S is detected by the post-registration sensor 33 at time tsn2 (illustrated by two-dot chain lines in FIG. 4). The control unit 20 calculates the time for changing the speed from V1 to V2 after receiving a signal that the leading edge of the sheet S has passed through the post-registration sensor 33, and outputs an instruction to change the speed to the registration motor 102. The control unit 20 requires approximately 10 milliseconds (ms) of a time to perform a sequence of operations described above. Therefore, even in the case of the controllable fastest arrival, after the passage of the leading edge of the sheet S through the post-registration sensor 33, it is necessary to secure the time Tex before starting the change in the speed.

A region Ar shown by breaking lines in FIG. 4 illustrates a sheet conveyance distance (hereinafter, referred to as a correction margin) that is correctable by the leading edge registration control. The correction margin that directly affects the leading edge registration accuracy is expressed by the product of a speed difference ΔV between the speeds V1 and V2 and a difference in timings ΔT at which the change in the speed from V1 to V2 starts.

Here, in the present embodiment, since the vertical path conveyance configuration is applied, all of the registration roller pair 12, the post-registration sensor 33, and, in addition, the pre-secondary transfer roller 14 are arranged adjacently to each other (refer to FIG. 3). Since, in the vertical path conveyance configuration described above, it is difficult to increase a difference ΔT in a timing at which the change in the speed from V1 to V2 starts, the correction margin D is secured by increasing the speed difference ΔV between the speeds V1 and V2. In particular, in the present embodiment, the speed V1 is set to be approximately 1.4 times larger than the speed V2.

Balancing Conveyance Load Torque and Leading Edge Registration Control

Next, with reference to a cross-sectional view of the vertical path conveyance of the present embodiment, issues encountered in executing the leading edge resist control will be described. As illustrated in FIG. 1, the image forming apparatus 1 possesses issues characteristic of a vertical path mechanism in which conveyance load torque in a case where the sheet S is fed from the multi-purpose feeding portion 115 and the duplex conveyance portion 190 to the registration roller pair 12 increases in comparison with a case where the sheet S is fed from the feed cassette 111.

Two reasons causing an increase in the conveyance load torque will be described. First, since, as a characteristic of the vertical path mechanism, the curvature of a conveyance path from the multi-purpose feeding portion 115 or the duple conveyance path 192 to the registration roller pair 12 is large, contact pressure with which the sheet S comes into contact with conveyance guides of each path is high, so that an increase in conveyance friction increases the conveyance load torque. Next, in the vertical path mechanism, a configuration in which a single motor drives two or more rollers is applied from a cost reduction perspective. In the present embodiment, the drawing roller pair 119 and the pre-registration roller pair 11 are driven by the drawing motor 104, and the re-conveyance roller pairs 193 and 194 are driven by the duplex motor 103. Therefore, since it is necessary for one motor to accommodate the acceleration and deceleration torque of two rollers, the conveyance load torque increases.

The conveyance load torque in post-registration sheet conveyance control (post-registration sheet conveyance control) peaks during a process of resuming the sheet conveyance from a state in which the sheet S is stopped at the registration roller pair 12 and accelerating to the speed Von that is the speed after the registration ON, and desynchronization risk is maximized for the drawing motor 104 and the duplex motor 103. Therefore, in conventional post-registration sheet conveyance control in which the leading edge registration control is not used, the speed Von after the registration ON is suppressed when performing multi feed and duplex conveyance. If this applies directly to the leading edge registration control, since the suppression of the speed Von after the registration ON suppresses the sheet conveyance speed V1 that is a speed at which the sheet passes through the post-registration sensor 33, the speed difference ΔV between the speeds V1 and V2 decreases, so that an issue of a decrease in the correction margin (region Ar) arises.

Accuracy Priority Mode

Figure 5:
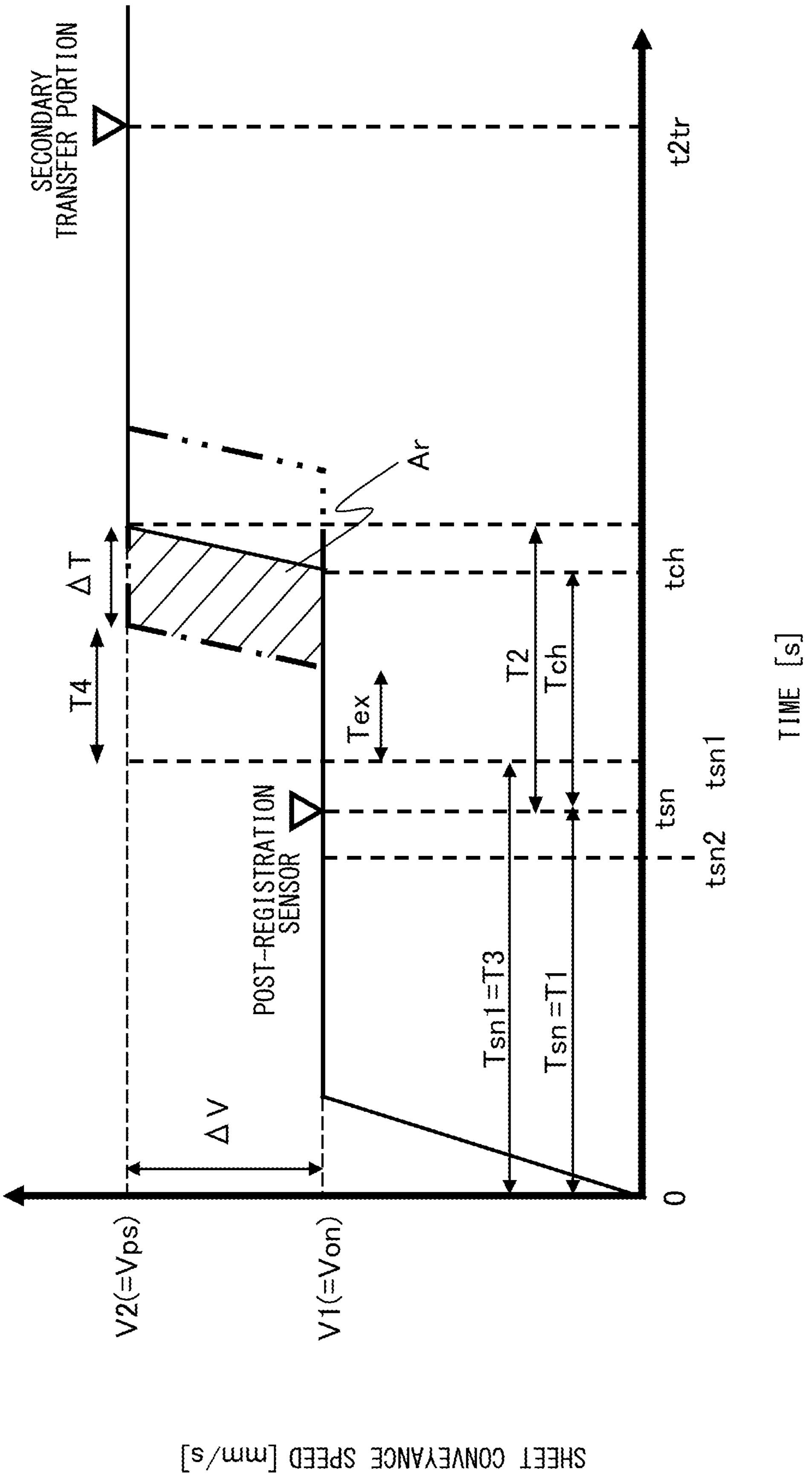
FIG. 5 is a graph illustrating an operation of an accuracy priority mode of the leading edge registration control in the image forming apparatus of the embodiment.

Then, a configuration of the present embodiment which, for a purpose of resolving this issue, establishes the leading edge registration control in systems where the conveyance load torque described above becomes the issue will be described using FIG. 5. FIG. 5 is a graph illustrating an accuracy priority mode of the sheet conveyance control of the registration roller pair 12, related to the leading edge registration control. As with FIG. 4, FIG. 5 illustrates the graph with time on a horizontal axis and the sheet conveyance speed on a vertical axis, setting the time of the registration ON as the zero point on the horizontal axis.

As illustrated in FIG. 5, in the accuracy priority mode, the sheet conveyance control of the registration roller pair 12 is characterized by a relationship in which the speed V1 is smaller than the speed V2. The correction margin D is secured by the speed difference ΔV between the speeds V1 and V2 that are set as described above.

Here, a length of a time from the detection of the leading edge of the sheet S by the post-registration sensor 33 at the time tsn to a time at which the conveyance speed is started to be changed from V1 to V2 at the time tch is referred to as Tch. For example, a scenario is considered where the passage time of the leading edge of the sheet S through the post-registration sensor 33 is slower than the predetermined time tsn and the leading edge of the sheet S is detected by the post-registration sensor 33 at time tsn1 (illustrated by one-dot chain lines in FIG. 5). In this case, by reducing the length of the time Tch to shorter than a predetermined value, a distance conveyed at the faster speed V2 is extended, and the delay is recovered. On the contrary, for example, a scenario is considered where the passage time of the leading edge of the sheet S through the post-registration sensor 33 is faster than the predetermined time tsn, and the leading edge of the sheet is detected by the post-registration sensor 33 at time tsn2 (illustrated by two-dot chain lines in FIG. 5). In this case, by extending the length of the time Tch before starting to change the speed from V1 to V2 after the passage of the leading edge of the sheet S through the post-registration sensor 33 to shorter than the predetermined value, the distance conveyed at the faster speed V2 is decreased.

That is, in the accuracy priority mode, the sheet S conveyed by, for example, the pre-registration roller pair 11 is abutted against the registration roller pair 12 that is stopping. Thereafter, the control unit 20 starts the rotation of the registration roller pair 12, and conveys the sheet S by accelerating to the speed V1 (serving as a first speed) within a range slower than the process speed Vps. Then, after the detection of the leading edge of the sheet, which is conveyed at the speed V1, by the post-registration sensor 33, the control unit 20 accelerates the conveyance speed of the sheet S from the speed V1 to the speed V2 (serving as a second speed) that is faster than the speed V1, and conveys the sheet S to the image forming unit 150. Further, during the execution of the accuracy priority mode, the length of a time from a start of the rotation of the registration roller pair 12 to the time at which the leading edge of the sheet S is detected by the post-registration sensor 33 is referred to as Tsn (=first time T1). In this case, the length of a time from the detection of the leading edge of the sheet S by the post-registration sensor 33 to the time at which the conveyance speed reaches the speed V2 is referred to as second time T2. On the other hand, the length of a time from the start of the rotation of the registration roller pair 12 to the time at which the leading edge of the sheet S is detected by the post-registration sensor 33 is referred to as Tsn1 (=third time T3) that is longer than Tsn. In this case, the length of the time from the detection of the leading edge of the sheet S by the post-registration sensor 33 to the time at which the conveyance speed reaches the speed V2 is referred to as fourth time T4 that is shorter than T2.

Thereby, since it becomes unnecessary to accelerate to a degree much greater than the process speed Vps, it is possible to accelerate without causing the motor desynchronization even in a state in which the conveyance load torque is large. Therefore, it becomes possible to secure a large leading edge registration amount, and is possible to improve correction accuracy in the leading edge registration control.

In the present embodiment, during the execution of the accuracy priority mode, the speed of the sheet S is maintained not to exceed the process speed V1 until the speed reaches the speed V1. That is, after the leading edge of the sheet S conveyed by, for example, pre-registration roller pair 11 has been abutted against the registration roller pair 12, the registration roller pair 12 starts the rotation, and the sheet S is conveyed by being accelerated to the speed V1 within a range slower than the speed V1. Thereby, since it is possible to suppress the acceleration of the sheet S as much as possible, it is possible to further improve the correction accuracy in the leading edge resist control.

Switch of Post-registration Sheet Conveyance Control

The image forming apparatus 1 of the present embodiment can execute the post-registration sheet conveyance control by switching between two types of the post-registration sheet conveyance control, that is, the speed priority mode (V1>V2) and the accuracy priority mode (V1<V2) according to a sheet feed unit that is chosen.

Upon receipt of the image formation instruction and the determination of the sheet feed unit, the control unit 20 determines the speeds V1 and V2 according to a type of the sheet feed unit. For example, in a case where feeding from the feed cassette 111, which requires small conveyance load torque and allows prioritization in productivity, is instructed, the control unit 20 selects the speed V1 that sets the speed priority mode. That is, the speed priority mode is executed in a case where the image is formed on the sheet S stored in the feed cassette 111. Values of the speeds V1 and V2 refer to speed values stored beforehand in the memory 202 according to a type of the sheet. The speed V2 refers to a value that approximates the process speed Vps.

Further, in a case where the multi-purpose feeding portion 115 or the feed from the duplex conveyance portion 190, which requires large conveyance load torque, is instructed, the control unit 20 selects the speed V1 that sets the accuracy priority mode. That is, the accuracy priority mode is executed in a case where the image is formed on sheet S supplied from the multi-purpose feeding portion 118 or the duplex path 192. The time Tsn that is a reference value of a time from the resumption of the rotation of the registration roller pair 12 to the time at which the passage of the leading edge of the sheet S through the post-registration sensor 33 and the time Tch that is the time before starting to change the speed from V1 to V2 after the passage of the leading edge of the sheet S through the post-registration sensor 33 refer to values stored beforehand in the memory 202 according to the type of the sheet.

As described above, according to the image forming apparatus 1 of the present embodiment, since it is possible to execute the accuracy priority mode which does not need to accelerate the speed to larger than the process speed Vps as needed in the speed priority mode, even in the case where the conveyance load torque is large, it is possible to accelerate without causing the motor desynchronization. Therefore, it becomes possible to secure the leading edge registration amount largely, and is possible to improve the correction accuracy of the leading edge resist control.

Further, according to the image forming apparatus of the present embodiment, since it is possible to switch between the speed priority mode and the accuracy priority mode, it is possible to increase a correctable leading edge registration amount while maintaining the productivity.

Further, according to the image forming apparatus 1 of the present embodiment, the speed of the sheet S is maintained so as not to exceed the process speed V1 until the speed reaches the speed V1. Therefore, since the acceleration of the sheet S is suppressed as much as possible, it is possible to further improve the correction accuracy in the leading edge resist control.

OTHER EMBODIMENTS

To be noted, while, in the embodiment described above, a case including two modes, namely, the speed priority mode and the accuracy priority mode, is described, it is not limited to this, and, for example, it is acceptable to include only the accuracy priority mode.

Figure 6:
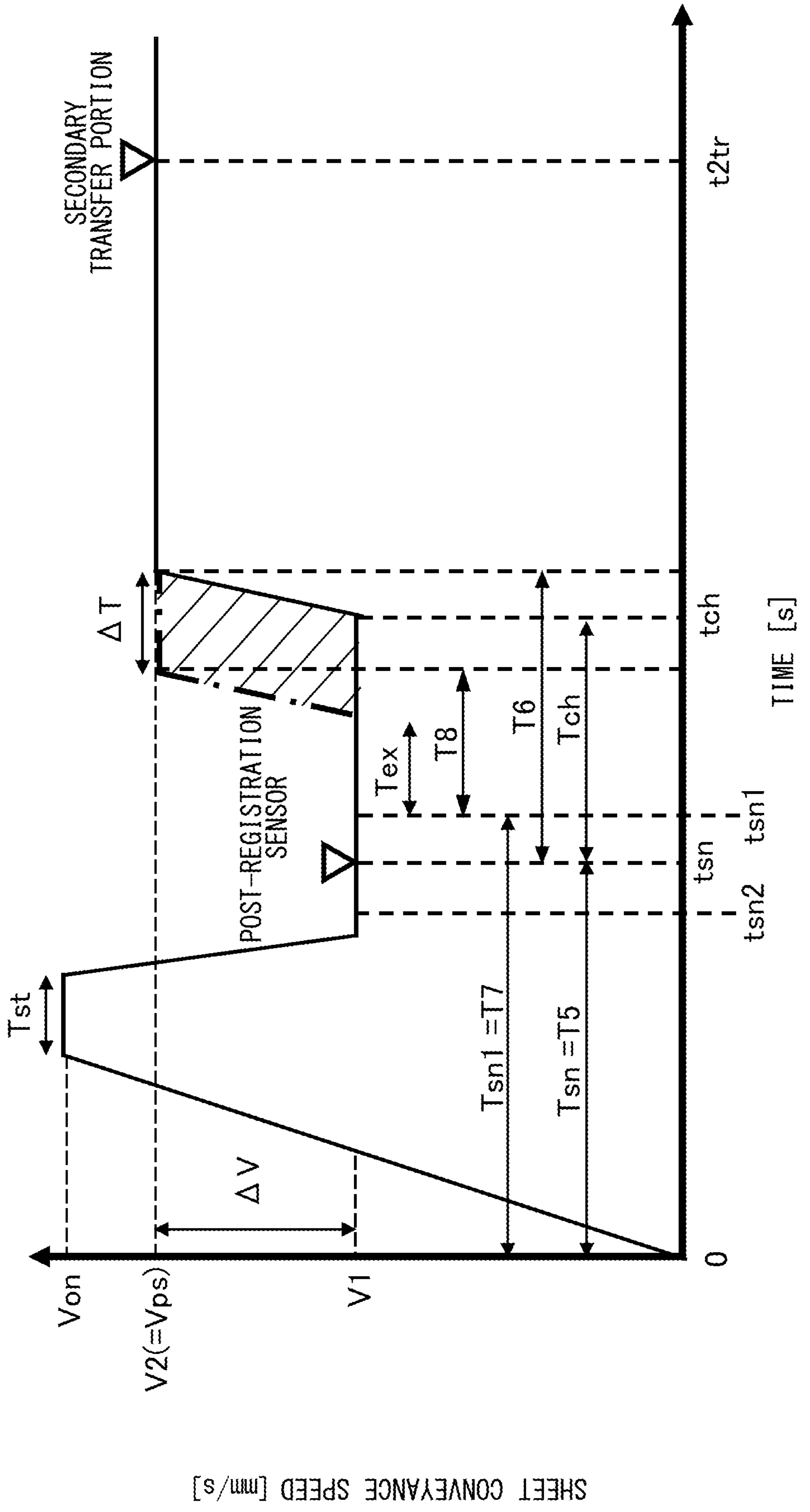
FIG. 6 is a graph illustrating an operation of an intermediate mode of the leading edge registration control in the image forming apparatus of the embodiment.

Further, it is acceptable to apply an intermediate mode in which the speed and accuracy priority modes are combined. Hereinafter, using FIG. 6, an example of the intermediate mode will be described. FIG. 6 is a graph illustrating the intermediate mode of the sheet conveyance control of the registration roller pair 12, related to the leading edge registration control. As with FIG. 4, FIG. 6 illustrates the graph with time on the horizontal axis and the sheet conveyance speed on the vertical axis, while setting the time of the registration ON as the zero point on the horizontal axis.

In the intermediate mode illustrated in FIG. 6, after the registration ON, the sheet conveyance speed is changed from the speed Von to the sheet conveyance speed V1 before the leading edge of the sheet passes through the post-registration sensor 33. The intermediate mode is characterized by the following conditions: the speed Von is an upper limit speed at which the conveyance load torque is allowed by the motor; the speed V1 is smaller than the speed V2. That is, the registration roller pair 12 starts the rotation after the leading edge of the sheet S conveyed by the pre-registration roller pair 11 has been abutted against the registration roller pair 12 that was stopping. Thereafter, after having been accelerated to the speed Von (fifth speed, eighth speed) that is faster than the process speed Vps, the sheet is conveyed by being decelerated to the speed V1 (sixth speed, ninth speed) that is slower the speed Von and the process speed Vps. Then, after the detection of the leading edge of the sheet S, which is conveyed at the speed V1, by the post-registration sensor 33, the conveyance speed of the sheet S is accelerated from the speed V1 to the speed V2 (seventh speed, tenth speed) that is faster than the speed V1, and then the sheet S is conveyed to the image forming unit 150.

In the execution of this intermediate mode, the length of a time from the start of the rotation of the registration roller pair 12 to the time at which the leading edge of the sheet S is detected by the post-registration sensor 33 is referred to as Tsn (=fifth time T5). In this case, the length of a time from the detection of the leading edge of the sheet S by the post-registration sensor 33 to the time at which the conveyance speed reaches the speed V2 is referred to as sixth time T6. At this time, a case where the length of the time from the start of the rotation of the registration roller pair 12 to the time at which the leading edge of the sheet S is detected by the post-registration sensor 33 is Tsn1 (=seventh time T7) that is longer than Tsn is considered. In this case, the length of the time from the detection of the leading edge of the sheet S by the post-registration sensor 33 to the time at which the conveyance speed reaches the speed V2 becomes eighth time T8 that is shorter than the time T6.

By the intermediate mode illustrated in FIG. 6, since, in comparison with a case illustrated in FIG. 5, in which the speed Von is equal to the speed V1 that is smaller than the speed V2, a time required for conveying the sheet S from the registration roller pair 12 to the secondary transfer portion 13 is shorter, it is possible to increase the productivity. Thereby, for example, even in a case where the productivity is not sufficient in the accuracy priority mode, it becomes possible to secure the productivity. At this time, while, for example, it is conceivable to increase the conveyance speed to the process speed Vps after the resumption of the rotation of the registration roller pair 12, since that is not sufficient to ensure the productivity, in the present embodiment, the conveyance speed is accelerated to a speed that exceeds the process speed Vps. According to the intermediate mode, it is possible to achieve higher accuracy than the speed priority mode, while increasing the productivity in comparison with the accuracy priority mode. To be noted, since it is necessary to change the speed from the speed Von to the speed V1 between the registration On and the passage of the leading edge of the sheet S through the post-registration sensor 33, a stabilization time Tst during which the speed Von is maintained becomes short. Since the conveyance load torque peaks at the time when acceleration to the speed Von is completed, if command for changing the speed is given to the motor immediately after the completion of the acceleration, the risk of the motor desynchronization is increased. Therefore, it is desirable to ensure that a sufficient time is set for the stabilization time Tst.

Further, for example, it is acceptable to incorporate the intermediate mode into the image forming apparatus 1, which already possesses the two modes, namely, the speed and accuracy priority modes, as with the embodiment described above, so as to make it possible to select and execute three different modes. In this case, for example, when, even if the productivity is slightly decreased, high accuracy is particularly required for the sheet S fed from the feed cassette 111, such as a case of full-screen printing, it is preferable to execute the intermediate mode. Alternatively, it is acceptable to include only the intermediate mode without including the speed and accuracy priority modes. Also, it is acceptable to include only the intermediate mode and the speed priority mode without including the accuracy priority mode, or only the intermediate mode and the accuracy priority mode without including the speed priority mode.

According to this disclosure, it is possible to improve the correction accuracy in the leading edge resist control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-032725, filed Mar. 3, 2023 which is hereby incorporated by reference herein in its entirety.

What is claimed is:

1. An image forming apparatus comprising:

an image forming unit configured to form an image on a sheet at an image forming position;

a registration roller pair positioned upstream of the image forming position in a conveyance path of the sheet, and configured to convey the sheet to the image forming position such that the image is formed on the sheet;

an upstream roller pair positioned upstream of the registration roller pair in the conveyance path, and configured to convey the sheet to the registration roller pair;

a detection unit configured to detect a leading edge of the sheet at a detecting position between the registration roller pair and the image forming position in the conveyance path;

a driving device configured to drive the registration roller pair and the upstream roller pair; and a control unit configured to control the driving device, wherein the control unit is configured to execute an accuracy priority mode and a speed priority mode selectively, wherein, in the accuracy priority mode, after the leading edge of the sheet conveyed by the upstream roller pair has abutted against the registration roller pair that was stopping, the control unit is configured to start rotation of the registration roller pair to convey the sheet while accelerating a conveyance speed of the sheet to a first speed within a range slower than a process speed of the image forming unit, and after the leading edge of the sheet has been detected by the detection unit, the control unit is configured to accelerate the conveyance speed from the first speed to a second speed faster than the first speed to convey the sheet to the image forming position, wherein, in the speed priority mode, after the leading edge of the sheet conveyed by the upstream roller pair has abutted against the registration roller pair that was stopping, the control unit is configured to start rotation of the registration roller pair to convey the sheet while accelerating the conveyance speed to a third speed faster than the process speed, and after the leading edge of the sheet has been detected by the detection unit, the control unit is configured to decelerate the conveyance speed from the third speed to a fourth speed that is slower than the third speed and is the process speed or faster to convey the sheet to the image forming position, and wherein, during execution of the accuracy priority mode, in a case where a time from start of the rotation of the registration roller pair to detection of the leading edge of the sheet by the detection unit is a first time, a time from the detection of the leading edge of the sheet by the detection unit to reach of the conveyance speed to the second speed is a second time, and, in a case where a time from the start of the rotation of the registration roller pair to the detection of the leading edge of the sheet by the detection unit is a third time, the time from the detection of the leading edge of the sheet by the detection unit to the reach of the conveyance speed to the second speed is a fourth time, the third time is longer than the first time and the fourth time is shorter than the second time.

2. The image forming apparatus according to claim 1, wherein the second speed is the process speed.

3. The image forming apparatus according to claim 1, wherein the fourth speed is the process speed.

4. The image forming apparatus according to claim 1, wherein, in the accuracy priority mode, after the leading edge of the sheet conveyed by the upstream roller pair has abutted against the registration roller pair that was stopping, the control unit is configured to start the rotation of registration roller pair to convey the sheet while accelerating the conveyance speed of the sheet to the first speed within a range slower than the first speed.

5. The image forming apparatus according to claim 1, wherein, the control unit is configured to execute an intermediate mode, and wherein, in the intermediate mode, after the leading edge of the sheet conveyed by the upstream roller pair has abutted against the registration roller pair that was stopping, the control unit is configured to start the rotation of the registration roller pair to convey the sheet such that the registration roller pair accelerates the sheet to a fifth speed faster than the process speed and decelerates the sheet to a sixth speed slower than the fifth speed and the process speed, and after the leading edge of the sheet has been detected by the detection unit, the control unit is configured to accelerate the conveyance speed from the sixth speed to a seventh speed faster than the sixth speed to convey the sheet to the image forming position.

6. The image forming apparatus according to claim 5, further comprising:

an apparatus body; and a sheet cassette provided in the apparatus body and upstream of the upstream roller pair in the conveyance path, and configured to accommodate the sheet fed to the upstream roller pair, wherein the control unit is configured to execute the intermediate mode in a case where the image forming unit forms the image on the sheet supplied from the sheet cassette.

7. The image forming apparatus according to claim 1, wherein the registration roller pair is provided such that, when viewed in a rotational axis direction of the registration roller pair, a smaller angle formed by a nip line of the registration roller pair and a horizontal line is equal to or more than 45 degrees.

8. The image forming apparatus according to claim 1, further comprising:

a manual feed tray provided upstream of the upstream roller pair in the conveyance path, and configured to support the sheet fed to the upstream roller pair, wherein the control unit is configured to execute the accuracy priority mode in a case where the image forming unit forms the image on the sheet supplied from the manual feed tray.

9. The image forming apparatus according to claim 1, further comprising:

a reverse portion configured to reverse and convey the sheet onto whose first surface the image has been transferred by the image forming unit to transfer the image on a second surface opposite to the first surface; and a duplex conveyance path through which the sheet reversed by the reverse portion is re-conveyed toward the upstream roller pair, wherein the control unit is configured to execute the accuracy priority mode in a case where the image forming unit forms the image on the sheet supplied from the duplex conveyance path.

10. The image forming apparatus according to claim 1, wherein the detection unit includes a photosensor including a light emitting portion emitting light to the conveyance path and a light receiving portion receiving the light emitted from the light emitting portion, and wherein the photosensor is configured to detect a passage of the leading edge of the sheet at the detecting position.

* * * * *